(12) United States Patent
Lane

(10) Patent No.: US 10,495,236 B1
(45) Date of Patent: Dec. 3, 2019

(54) ELECTRICAL WIRE BRIDLE

(71) Applicant: Mitchel N. Lane, Council Bluffs, IA (US)

(72) Inventor: Mitchel N. Lane, Council Bluffs, IA (US)

(73) Assignee: ECHO GROUP INC., Council Bluffs, IA (US)

( * ) Notice: Subject to any disclaimer, the term of this patent is extended or adjusted under 35 U.S.C. 154(b) by 0 days.

(21) Appl. No.: 16/122,058

(22) Filed: Sep. 5, 2018

(51) Int. Cl.
*F16L 3/06* (2006.01)
*H02G 3/08* (2006.01)

(52) U.S. Cl.
CPC . *F16L 3/06* (2013.01); *H02G 3/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,544,266 A * | 3/1951 | Kennedy | | B21D 51/52 220/3.94 |
| 5,752,682 A * | 5/1998 | Anderson | | H02G 3/26 248/316.7 |
| 6,375,129 B2 * | 4/2002 | Koziol | | H02G 3/26 174/662 |
| 6,396,992 B1 * | 5/2002 | Debal | | H04Q 1/13 385/135 |
| 6,679,722 B1 * | 1/2004 | Pulizzi | | H01R 13/562 439/451 |
| 6,930,244 B1 * | 8/2005 | Nebel | | B60R 16/0207 174/486 |
| 7,026,551 B2 * | 4/2006 | Franz | | H02B 1/202 174/69 |
| 7,569,772 B2 * | 8/2009 | McClellan | | H04Q 1/06 174/69 |
| 9,310,013 B2 * | 4/2016 | Komaro | | F16L 3/127 |
| 10,340,674 B1 * | 7/2019 | Chompff | | H02G 3/0456 |
| 2001/0019094 A1 * | 9/2001 | Koziol | | F16L 3/04 248/69 |
| 2004/0035983 A1 * | 2/2004 | Simonson | | H02G 15/007 248/49 |
| 2014/0021309 A1 * | 1/2014 | Rouleau | | H02G 3/32 248/69 |
| 2017/0184224 A1 * | 6/2017 | Cheng | | F16L 3/137 |

* cited by examiner

*Primary Examiner* — Monica E Millner
(74) *Attorney, Agent, or Firm* — Dennis L. Thomte; Thomte Patent Law Office LLC

(57) ABSTRACT

An electrical wire bridle is disclosed for use in an electrical junction box or electrical control panel. The bridle is comprised of a rectangular support member having a first end, a second end, a first side, a second side, an inner side and an outer side. The support member has a plurality of spaced-apart loop members which extend outwardly from the outer side thereof. The loop members are configured to have a tie secured thereto to enable one or more electrical wires to be secured to the support member. The support member has connectors thereon to enable bridles to be secured together in an end-to-end manner. The support member may be secured to the junction box or control panel by screws, rivets or adhesive tape.

13 Claims, 9 Drawing Sheets

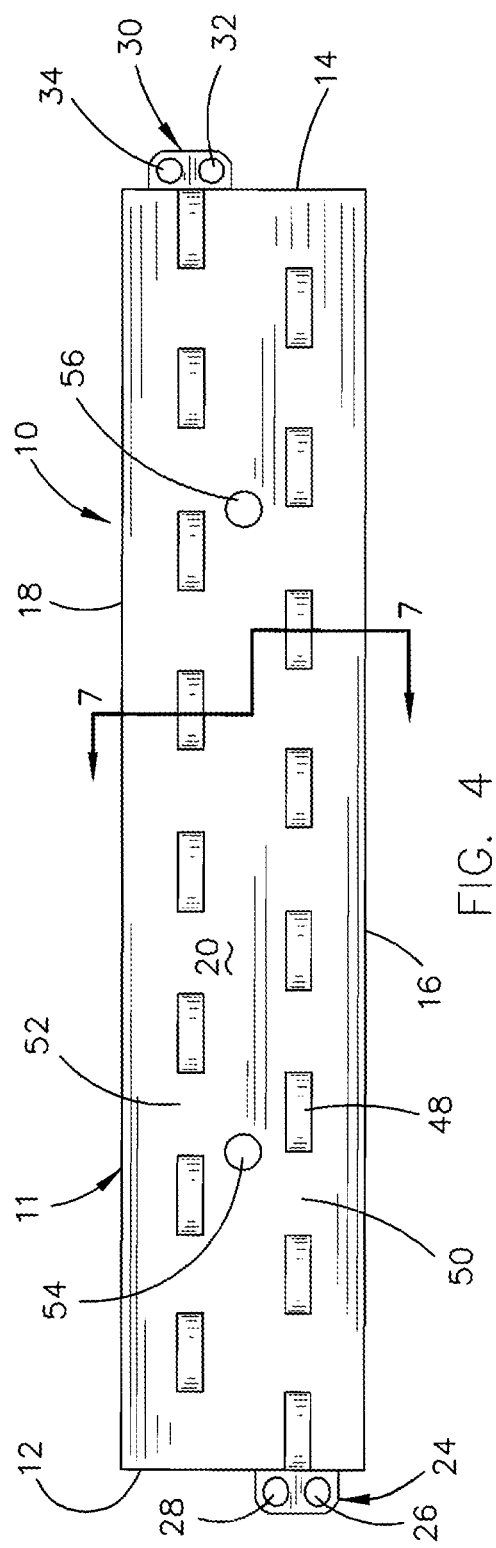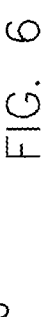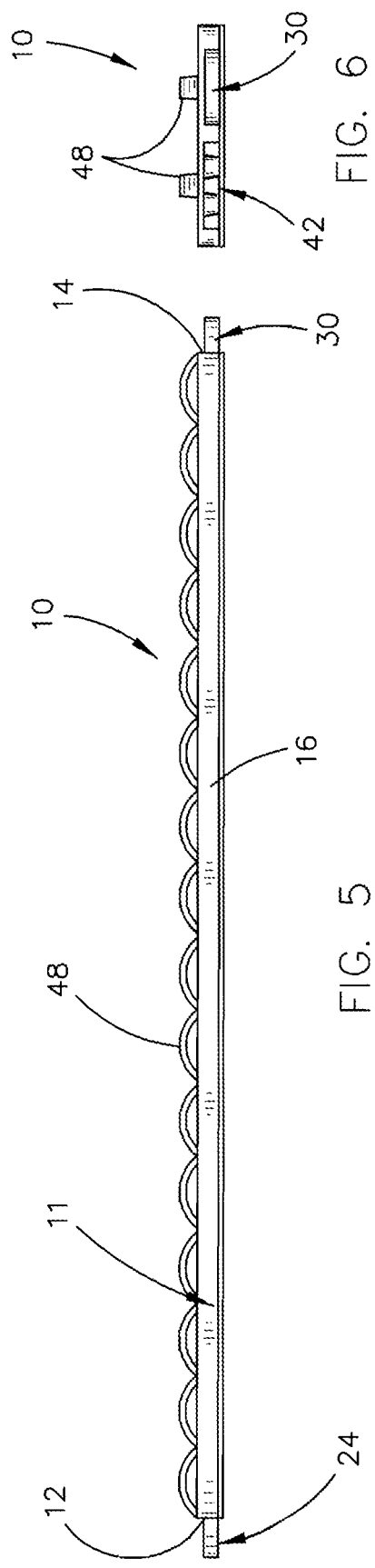

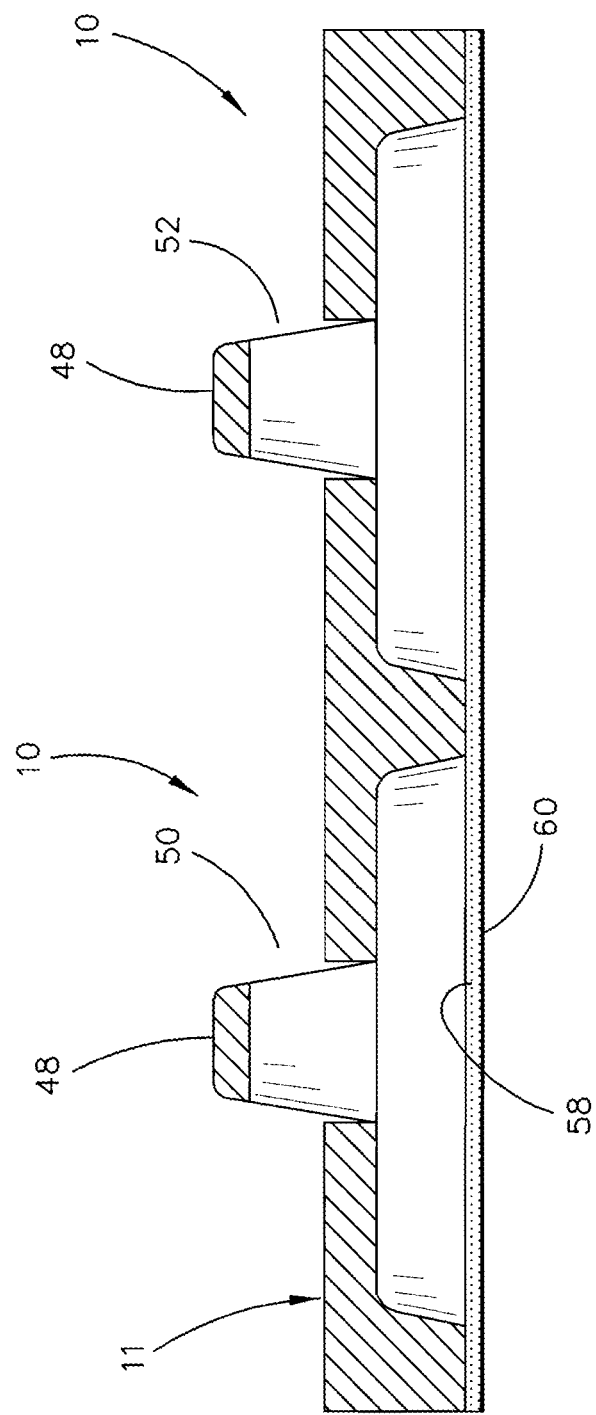

ELECTRICAL WIRE BRIDLE

BACKGROUND OF THE INVENTION

Field of the Invention

This invention relates to an electrical wire bridle and more particularly relates to an electrical wire bridle for use in an electrical junction box or control panel. Even more particularly, this invention relates to electrical wire bridles which may be secured to one another in an end-to-end manner. Even more particularly, this invention relates to a simple, easy to use, wire management device which helps with the organization of electrical wires within an electrical control panel or junction box.

Description of the Related Art

Electrical junction boxes or control panels have been long used to provide an enclosure which protects the connection or junction of a plurality of electrical wires carrying electrical current. In most cases, a large number of electrical wires, which are connected to various outlets and switches, extend into the junction box. In most cases, the incoming wires are connected to circuit breakers. Electrical wires extend from the output side of the circuit breakers to a main electrical panel or the source of electrical power.

In many cases, there are a very large number of incoming electrical wires and a large number of outgoing electrical wires positioned within the box or panel which results in a disorganized and unsightly appearing junction box.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An electrical wire bridle is disclosed which includes a rectangular support member having a first end, a second end, a first side, a second side, an outer side and an inner side. The support member has a first connector extending from the first end of the support member at the first side thereof. The first connector has first and second openings formed therein. The support member also has a second connector extending from the second end of the support member at the second side thereof with the second connector having first and second openings formed therein. The support member has a third connector at the inner side thereof which is positioned at the first end of the support member at the second side thereof. The support member also has a fourth connector at the inner side thereof which is positioned at the second end of the support member at the first side thereof. Each of the third and fourth connectors has a pair of tapered projections or posts extending therefrom which correspond to the first and second openings formed in the first and second connectors.

The outer side of the support member has a plurality of spaced-apart loop members extending outwardly therefrom. Each of the loop members is configured to have a flexible tie extending therethrough for attaching an electrical wire or wires to the support member.

The bridle of this invention is designed to enable a second bridle to be secured thereto in an end-to-end manner. Preferably, the support member has a pair of spaced-apart openings formed therein which are adapted to have a rivet or screw extending therethrough which secures the support member to a supporting surface. The inner side of the support member may also have a strip of double-faced adhesive tape secured thereto to enable the support member to be secured to a supporting surface.

It is therefore a principal object of the invention to provide an improved electrical wire bridle.

A further object of the invention is to provide an electrical wire bridle which enables another bridle to be secured thereto in an end-to-end manner.

A further object of the invention is to provide an electrical wire bridle which may be secured to a supporting surface by either rivets, screws or adhesive tape.

A further object of the invention is to provide a simple, easy to use, wire management system for electrical control panels or electrical junction boxes to assist with the organization of the wires within the electrical control panel or electrical junction box.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 is a plan view of the outer side of the bridle of this invention;

FIG. 5 is a side view of the bridle of this invention;

FIG. 6 is an end view of the bridle of this invention;

FIG. 7 is a sectional view as seen on lines 7-7 of FIG. 4;

DESCRIPTION OF THE PREFERRED EMBODIMENT

Figure 1:
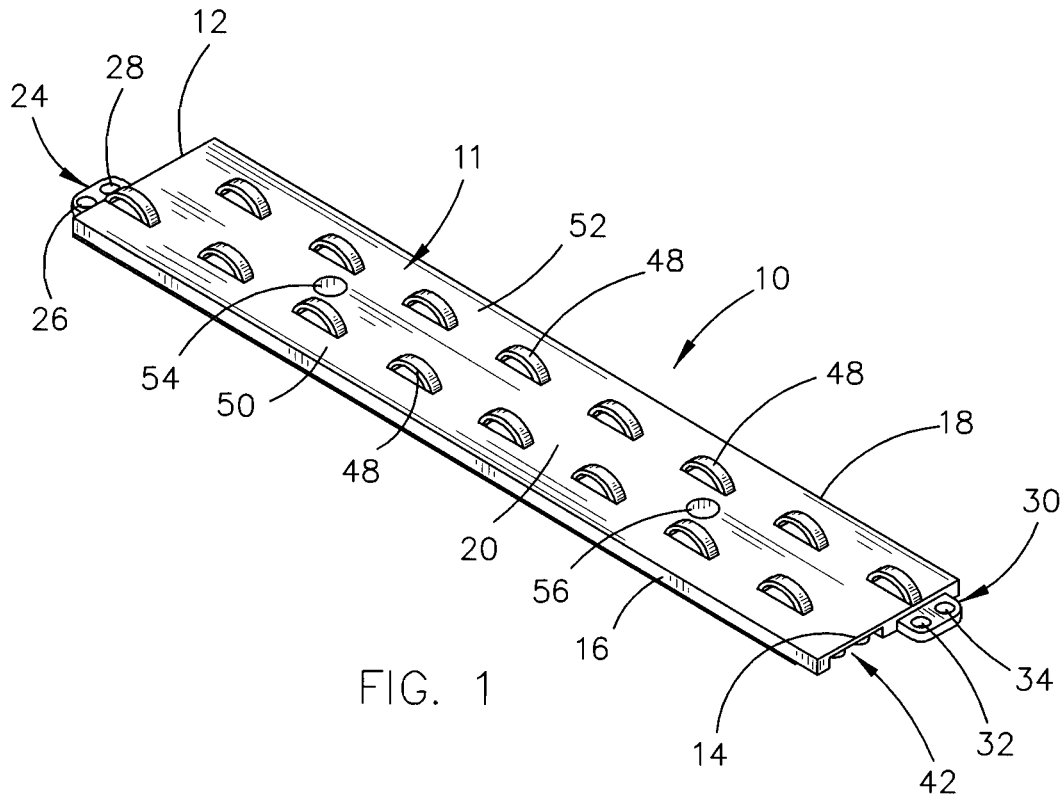
FIG. 1 is an outer perspective view of the electrical wire bridle of this invention.
Figure 2:
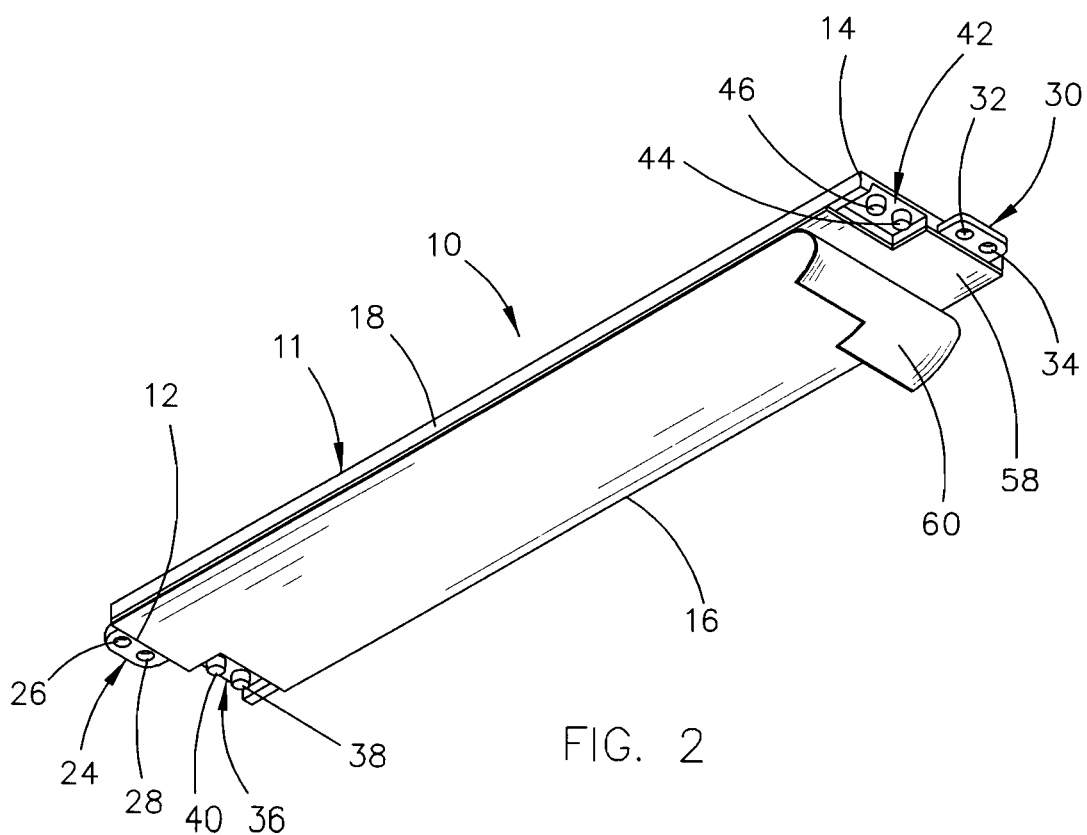
FIG. 2 is a partial bottom perspective view of the electrical wire bridle of this invention which illustrates the protective cover sheet being removed from the double-faced adhesive sheet which is secured to the inner side of the bridle.
Figure 3:
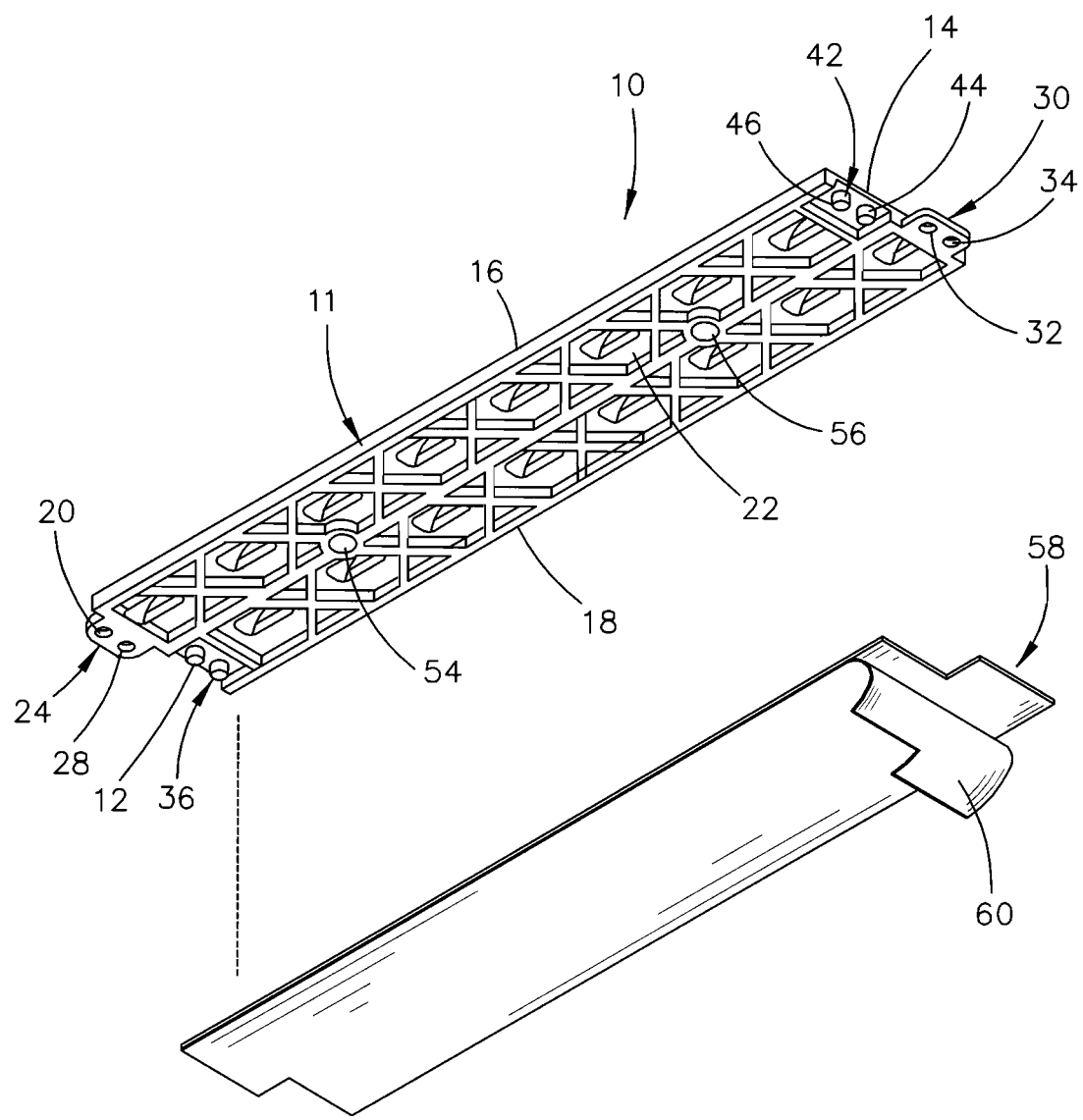
FIG. 3 is an exploded inner perspective view of the bridle of this invention which also shows the double faced adhesive sheet having its protective cover sheet being removed therefrom.
Figure 8:
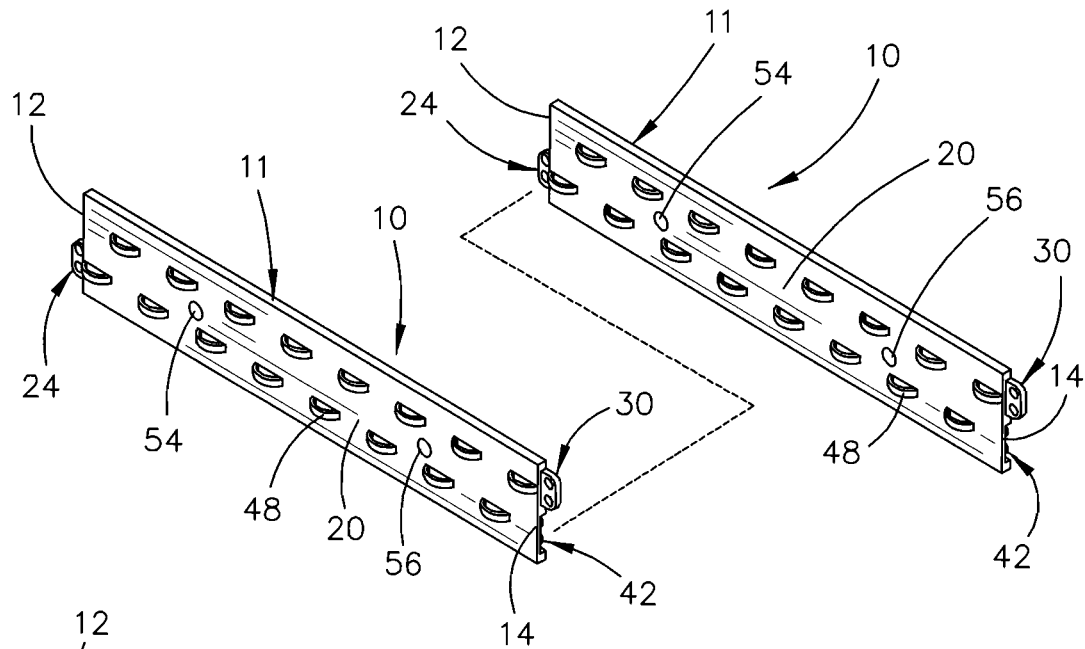
FIG. 8 is an exploded perspective view of two of the bridles about to be connected to one another in an end-to-end manner.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the electrical wire bridle of this invention. Bridle 10 is ideally suited for use with an electrical junction box or electrical control panel as will be described in detail hereinafter. Bridle 10 includes a generally rectangular-shaped support member 11 which has a first end 12, a second end 14, a first side 16, a second side 18, an outer side 20 and an inner side 22. Although support member 11 is described as having an outer side and an inner side, such reference is merely used for purposes of description since the support member 11 may be mounted in different ways and orientations.

Support member 11 includes a tab-like connector 24 which extends from end 12 at side 16 of support member 11. Connector 24 has a pair of openings 26 and 28 formed therein. Support member 11 also includes a tab-like connector 30 which extends from end 14 at side 18 of support member 11. Connector 30 has a pair of openings 32 and 34 formed therein.

The numeral 36 refers to a connector which is formed in the lower side 22 of support member 11 at end 12 thereof at the second side 18 thereof. Connector 36 includes a pair of tapered protrusions or posts 38 and 40 extending therefrom. The numeral 42 refers to a connector which is formed in the lower side 22 of support member 11 at end 14 thereof at the first side 16 thereof. Connector 42 includes a pair of tapered protrusions or posts 44 and 46 extending therefrom.

Support member 11 has a plurality of raised, semi-circular loops 48 extending outwardly from outer side 20 of support member 11. The loops 48 are arranged in rows 50 and 52 in a spaced-apart manner. As seen, the loops 48 in row 50 are staggered or offset with respect to the loops 48 in row 52.

Preferably, support member 11 has a pair of screw, bolt or rivet openings 54 and 56 formed therein to enable the support member 11 to be secured to a supporting member or surface. Preferably, the inner side 22 of support member 11 has a strip or sheet 58 of double-faced adhesive tape secured thereto to enable the support member 11 to be secured to a supporting member or surface. Strip 58 will normally be covered or protected by a non-sticking strip or sheet 60 until the bridle is adhesively secured to a supporting surface.

Figure 9:
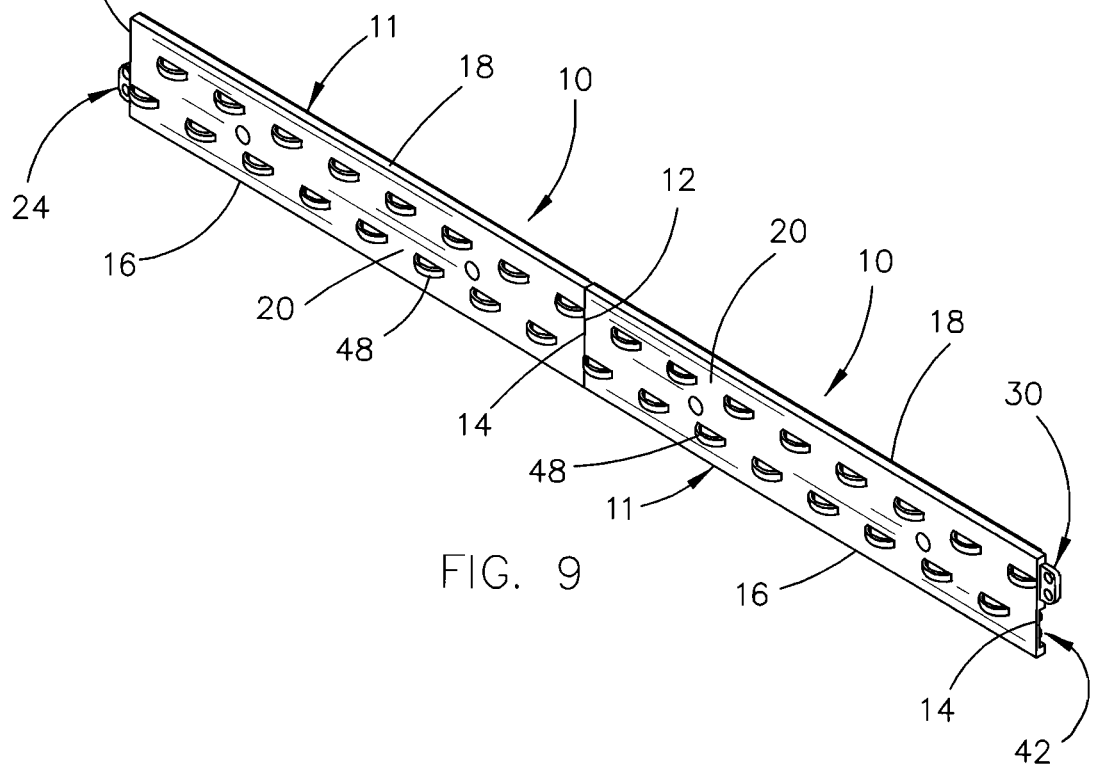
FIG. 9 is a perspective view illustrating two of the bridles being secured to one another in an end-to-end manner.
Figure 10:
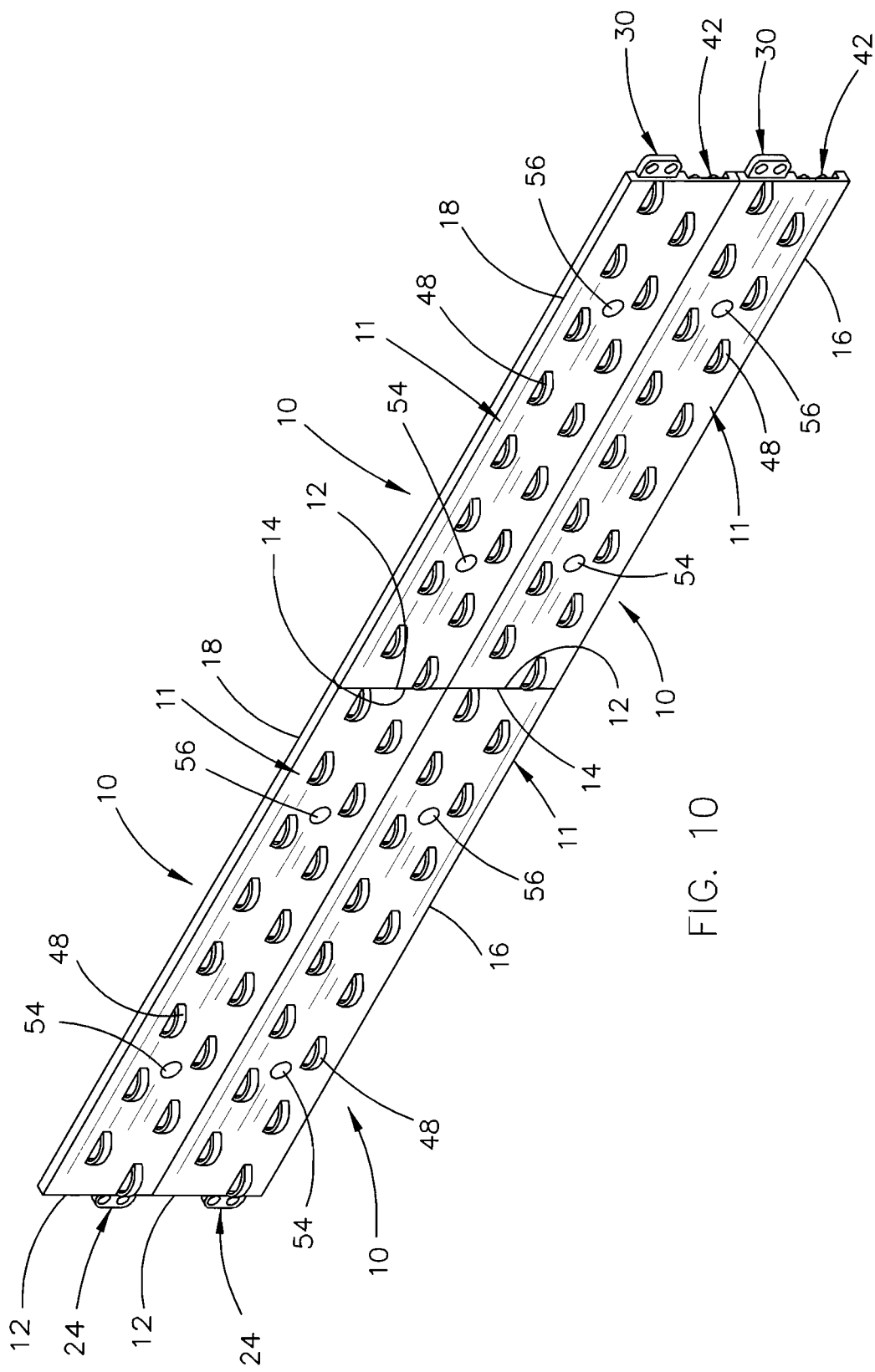
FIG. 10 is a perspective view of two pairs of the bridle.
Figure 11:
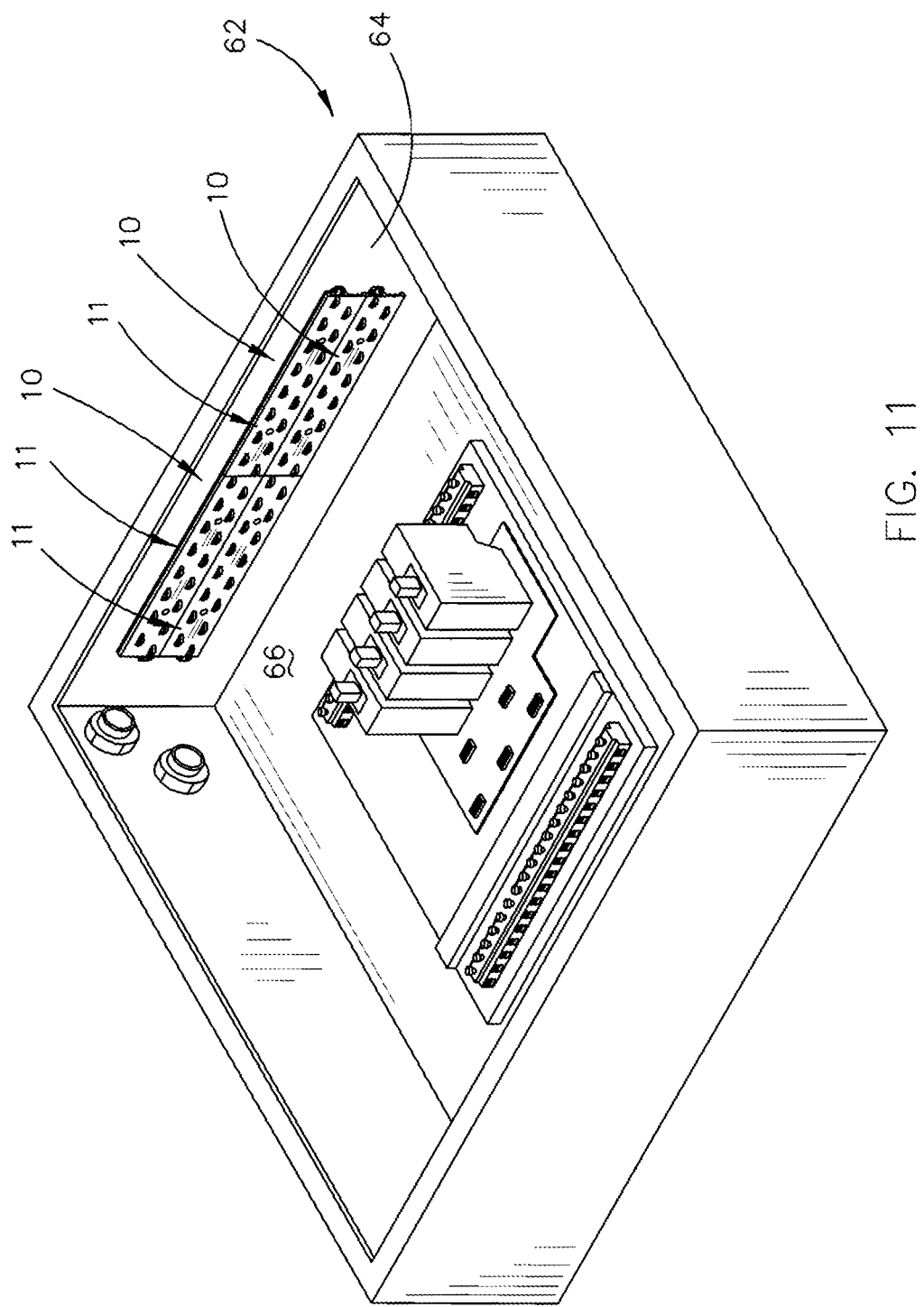
FIG. 11 is a perspective view of the interior of an electrical junction box or electrical control panel having four of the bridles positioned therein.
Figure 12A:
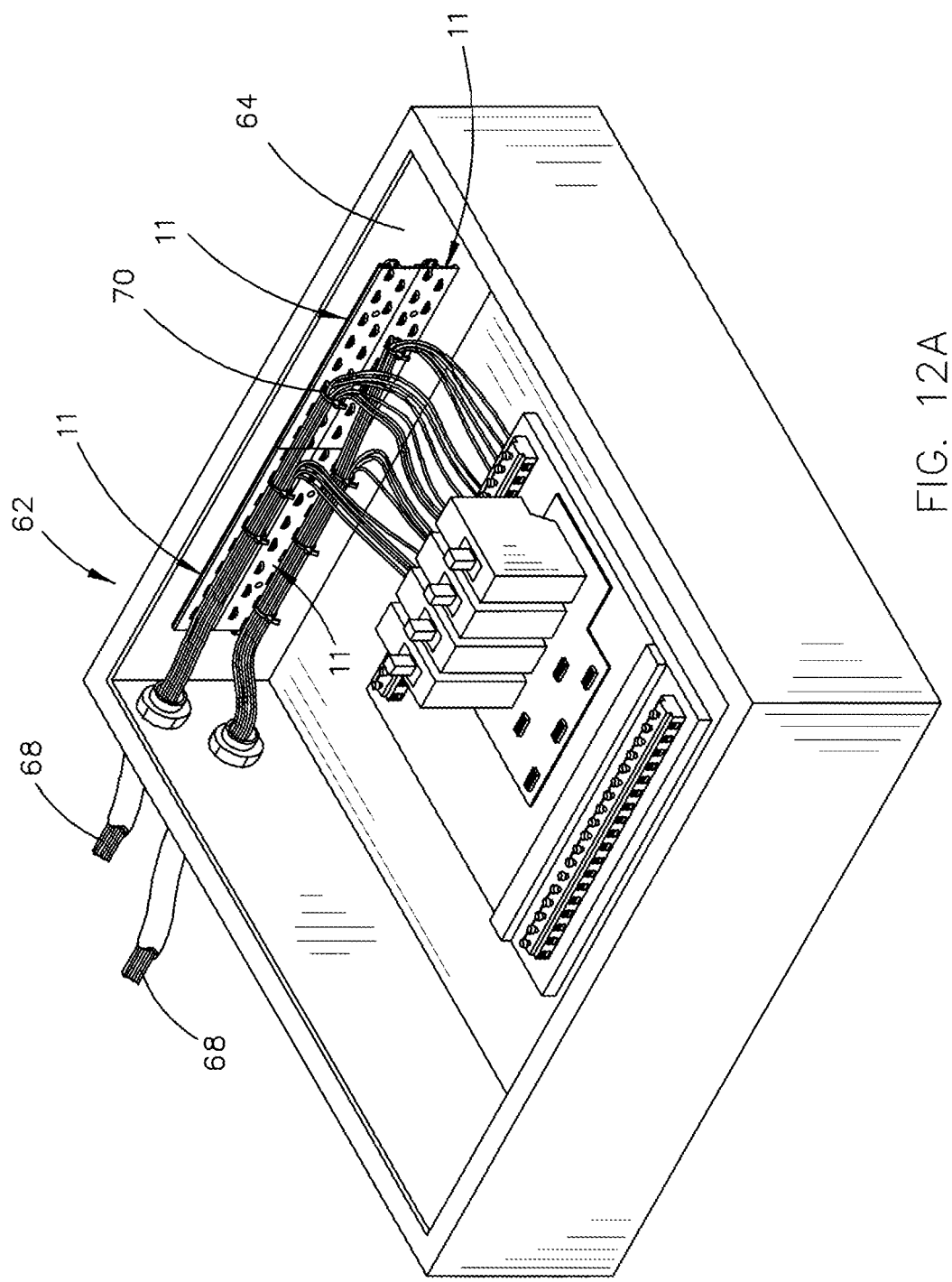
FIG. 12A is a perspective view similar to FIG. 11 except that electrical wires are illustrated as being connected to the bridles.
Figure 12B:
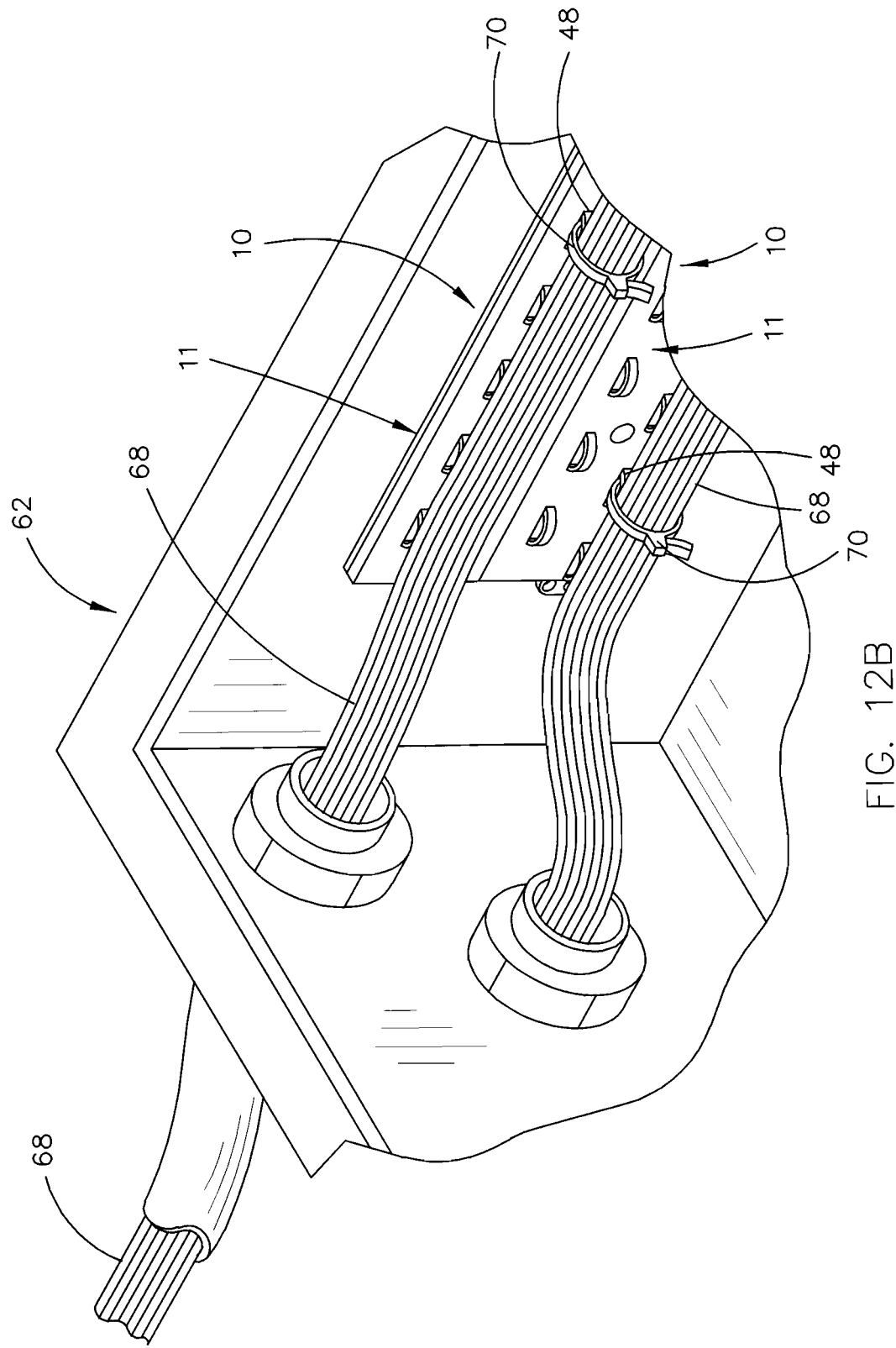
FIG. 12B is a partial perspective enlarged view of FIG. 12A.

The bridle or bridles 10 are ideally suited for an electrical junction box 62, an electrical control panel or other structure which has a large number of electrical wires 68 coming into and leaving the structure. The invention will be described as being used in an electrical junction box. Junction box 62 may have the bridle or bridles 10 mounted on the side 64 of the junction box 62. The bridles 10 may be mounted on any of the other walls of junction box 62. The bridle 10 or bridles 10 may be secured to their supporting surfaces by screws or rivets extending through openings 54 and 56 thereof. The bridle 10 or bridles 10 may also be secured by using the double-faced adhesive strip 58. The bridle 10 may be singularly mounted in the junction box 62 or mounted with other bridles 10 as seen in FIG. 12A. A pair of the bridles 10 may be mounted in an end-to-end manner as seen in FIG. 9. In such a fashion, the connector 24 of the second bridle 10 will be snap-fitted to the connector 42 of the first bridle with the protrusions 44 and 46 being received by the openings 26 and 28 in connector 30 of the mating bridles. The connector 30 of the first bridle will be snap-fitted to the connector 36 of the second bridle. The bridle 10 may have several other bridles 10 connected thereto in an end-to-end manner if so desired.

As seen in FIG. 12A, a plurality of electrical wires 68 come into the junction box 62. The electrical wires 68 may be individually secured to the loop members 48, or as a group, by way of a tie 70 extending through the loop member 48 and around the wire or wires 68 as seen in FIG. 12A. The mounting of the wires 68, either individually to the loop members 48 or as a group, results in a simple, easy to use, wire management device which helps with the organization of the electrical wires within the junction box 62.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An electrical wire bridle assembly, comprising:
    a rectangular first support member having a first end, a second end, a first side, a second side, an outer side and an inner side;
    said first support member having a first connector extending from said first end of said support member at said first side thereof;
    said first connector of said first support having first and second openings formed therein;
    said first support member having a second connector extending from said second end of said first support member at said second side thereof;
    said second connector of said first support member having first and second openings formed therein;
    said first support member having a third connector at said inner side thereof which is positioned at said first end of said first support member at said second side thereof;
    said first support member having a fourth connector at said inner side thereof which is positioned at said second end of said first support member at said first side thereof;
    said outer side of said first support member having a plurality of spaced-apart loop members extending outwardly therefrom; and
    each of said loop members of said first support member being configured to have a flexible tie extending therethrough for attaching one or more electrical wires to said support member;
    a rectangular second support member having a first end, a second end, a first side, a second side, an outer side and an inner side;
    said second support member having a first connector extending from said first end of said second support member at said first side thereof;
    said second support member having a second connector extending from said second end of said second support member at said second side thereof;
    said second support member having a third connector at said inner side thereof which is positioned at said first end of said second support member at said second side thereof;

said second support member having a fourth connector at said inner side thereof which is positioned at said second end of said second support member at said first side thereof;

said outer side of said second support member having a plurality of spaced-apart loop members extending outwardly therefrom;

each of said loop members being configured to have a flexible tie extending therethrough for attaching one or more electrical wires to said second support member;

said second first and second support members being selectively connected together in an end-to-end relationship wherein said first end of said second support member is positioned at said second end of said first support member and wherein:

(a) said first connector of said second support member is secured to said fourth connector of said first support member, and (b) said second connector of said first support member is secured to said third connector of said second support member.

2. The electrical wire bridle of claim 1 wherein said loop members of each of said first and second support members define first and second rows of loop members.

3. The electrical wire bridle of claim 2 wherein said loop members of said first row are staggered with respect to said loop members of said second row of loop members.

4. The electrical wire bridle of claim 1 wherein each of said first and second support members have a pair of attachment holes formed therein.

5. The electrical wire bridle of claim 1 wherein a strip of double-faced adhesive tape is secured to said inner side of each of said first and second support members.

6. The electrical wire bridle of claim 1 wherein each of said first and second connectors of said first and second support members have a pair of openings formed therein and wherein each of said third and fourth connectors of said first and second support members have a pair of protrusions extending therefrom which correspond to said pair of openings in said first and second connectors of said first and second support members.

7. The electrical wire bridle of claim 6 wherein each of said protrusions are tapered.

8. An electrical wire bridle, comprising:

a rectangular support member having a first end, a second end, a first side, a second side, an outer side and an inner side;

said support member having a first connector extending from said first end of said support member at said first side thereof;

said support member having a second connector extending from said second end of said support member at said second side thereof;

said support member having a third connector at said inner side thereof which is positioned at said first end of said support member at said second side thereof;

said support member having a fourth connector at said inner side thereof which is positioned at said second end of said support member at said first side thereof;

said outer side of said support member having a plurality of spaced-apart loop members extending outwardly therefrom;

each of said loop members being configured to have a flexible tie extending therethrough for attaching one or more electrical wires to said support member;

each of said first and second connectors having a pair of spaced-apart openings formed therein; and each of said third and fourth connectors including a pair of spaced-apart protrusions which match the said pair of openings of said first and second connectors.

9. An electrical wire bridle, comprising:

a rectangular support member having a first end, a second end, a first side, a second side, an outer side and an inner side;

said support member having a first connector extending from said first end of said support member at said first side thereof;

said support member having a second connector extending from said second end of said support member at said second side thereof;

said support member having a third connector at said inner side thereof which is positioned at said first end of said support member at said second side thereof;

said support member having a fourth connector at said inner side thereof which is positioned at said second end of said support member at said first side thereof;

said outer side of said support member having a plurality of spaced-apart loop members extending outwardly therefrom;

said support member, said first connector, said second connector, said third connector, said fourth connector and said loop members being of one-piece construction; and said loop members defining first and second straight rows of loop members.

10. The electrical wire bridle of claim 9 wherein said loop members of said first row are staggered with respect to said loop members of said second row of loop members.

11. The electrical bridle of claim 9 wherein said support member has a pair of attachment holes formed therein.

12. The electrical wire bridle of claim 9 wherein each of said first and second connectors have a pair of spaced-apart openings formed therein and wherein each of said third and fourth connectors include a pair of spaced-apart protrusions which match the pair of openings of said first and second connectors.

13. An electrical wire bridle, comprising:

a rectangular one-piece support member having a first end, a second end, a first side, a second side, an outer side and an inner side;

said support member having a first tab connector extending outwardly from said first end of said support member at said first side thereof;

said support member having a second tab connector extending outwardly from said second end of said support member at said second side thereof;

said support member having a third connector formed in said inner side thereof which is positioned inwardly of said first end of said support member at said second side thereof;

said support member having a fourth connector formed in said inner side thereof which is positioned inwardly of said second end of said support member at said first side thereof;

said outer side of said support member having a plurality of spaced-apart loop members extending outwardly therefrom; and each of said loop members being configured to have a flexible tie extending therethrough for attaching one or more electrical wires to said support member.

* * * * *